United States Patent [19]
Nakayama et al.

[11] Patent Number: 6,163,135
[45] Date of Patent: Dec. 19, 2000

[54] APPARATUS FOR CONTROLLING STATE OF CHARGE/DISCHARGE OF HYBRID CAR AND METHOD FOR CONTROLLING STATE OF CHARGE/DISCHARGE OF HYBRID CAR

[75] Inventors: Yoshiyuki Nakayama; Masahiko Mitsui; Yoshiaki Kikuchi; Kazuo Tojima, all of Toyota, Japan

[73] Assignee: Toyota Jidosha Kabushiki Kaisha, Toyota, Japan

[21] Appl. No.: 09/383,988

[22] Filed: Aug. 26, 1999

[30]     Foreign Application Priority Data

Sep. 7, 1998  [JP]  Japan ................................. 10-253057

[51] Int. Cl.⁷ .......................... H01M 10/44; H01M 10/46
[52] U.S. Cl. ............................................................... 320/150
[58] Field of Search ..................................... 370/127, 128, 370/131, 132, 134, 136, 150, 153; 180/65.1

[56]              References Cited

U.S. PATENT DOCUMENTS

| 5,508,126 | 4/1996 | Braun ................................. 320/150 X |
| 5,834,131 | 11/1998 | Lutz et al. ................................. 429/7 |
| 6,029,762 | 2/2000 | Kepner ................................. 180/65.1 |

FOREIGN PATENT DOCUMENTS 7-79503  3/1995  Japan .

*Primary Examiner*—Edward H. Tso
*Attorney, Agent, or Firm*—Oliff & Berridge, PLC

[57]            ABSTRACT

The temperature of a battery in a hybrid car is supervised by temperature sensors. When the temperature of the battery is at a temperature not exceeding a predetermined temperature, a battery ECU issues a command to a control CPU to perform forcible charge/discharge of the battery to raise the temperature of the battery. When raising of the temperature is performed by charging, a requested output from an engine is increased as compared with a usual state. In such a state, motor-generators are operated as generators so as to generate electric power and charge the battery by passing an electric current to the battery rather than generating a driving force. When raising of the temperature is performed by discharging, the requested output from the engine is reduced as compared with the usual state. In this case, the motor-generators are operated as drive motors to consume electric power so as to draw electric current from the battery causing discharge of the battery. The electric current allowed to flow at this time causes internal resistance to be generated in the battery that heats the battery from an inside portion thereof. Thus, an apparatus for controlling a charge/discharge state of a hybrid car can be provided that quickly and easily controls the temperature of the battery to a predetermined temperature.

18 Claims, 4 Drawing Sheets

APPARATUS FOR CONTROLLING STATE OF CHARGE/DISCHARGE OF HYBRID CAR AND METHOD FOR CONTROLLING STATE OF CHARGE/DISCHARGE OF HYBRID CAR

INCORPORATION BY REFERENCE

The disclosure of Japanese Patent Application No. HEI 10-253057 filed on Sep. 7, 1998 including the specification, drawings and abstract is incorporated herein by reference in their entirety.

BACKGROUND OF THE INVENTION

1. Field of the Invention

The present invention relates to an apparatus for controlling a charge/discharge state of a hybrid car, incorporating a generator arranged to be driven by an engine and a motor for driving a vehicle, and more particularly, to an apparatus for controlling a charge/discharge state of a hybrid car that can quickly control a battery temperature to a predetermined temperature. The present invention also relates to a method for controlling a charge/discharge state of a hybrid car.

2. Description of the Related Art

A hybrid car incorporating a generator that is driven by an engine and a motor for driving a vehicle has been known. This hybrid car is designed to charge a battery with electric power obtained by the generator. Moreover, electric power discharged from the battery is used to rotate the motor so as to run the vehicle. In a usual state, a rotating force of the engine can directly be transmitted to the car's wheels. Moreover, a regenerative braking operation is performed as a braking operation corresponding to the engine brake. Also, electric power generated from the motor as a result of the regenerative braking is used to charge the battery.

Power generation in such a hybrid car is controlled so that an amount of charge (a state of charge which is hereinafter referred to as an "SOC") of the battery satisfies a predetermined range. That is, when the SOC of the battery is 0%, the vehicle is disabled to run. When the SOC is 100%, the battery cannot receive electric power generated by the regenerative braking operation. Therefore, a predetermined target SOC (for example, 50%) is set, and power generation performed by the generator is controlled so that the SOC of the battery becomes the target SOC value. As a result of the foregoing control, the SOC of the battery is allowed to always satisfy a predetermined range of about 50% (ranging from, for example, 20% to 80%).

The performance of the battery, however, deteriorates in a state where the temperature is low. When a battery that is capable of outputting electric power of about 21 KW in an optimum temperature state, such as for example, 20° C. to 40° C., is instead operated at 0° C., the obtained output is as low as about 5 KW. In principle, the hybrid car is designed to operate the battery in a case where the output from the engine is assisted, for example, full acceleration is performed or the hybrid car is started. If the temperature of the battery is low as described above, and in particular, in case of an early morning in winter or in a cold region, a predetermined output cannot be obtained. Thus, there arises a problem that the hybrid car is prevented from performing smooth starting and acceleration. If the temperature of the battery is at a temperature not exceeding a predetermined temperature, a method may be employed with which warming-up of the engine is performed to raise the ambient temperature of the battery so as to increase the temperature of the battery to the predetermined value. In the foregoing case, however, warming-up has to be performed for a long time. Also in the foregoing case, quick start and acceleration at the required timing cannot be performed.

SUMMARY OF THE INVENTION

In view of the foregoing problems, an object of the present invention is to provide an apparatus for controlling a charge/discharge state of a hybrid car that is capable of quickly and easily controlling a battery to a predetermined temperature and obtaining a predetermined large output.

To achieve the foregoing object, according to one aspect of the present invention, there is provided an apparatus for controlling a charge/discharge state of a hybrid car, including a generator for performing an operation for charging a battery, a motor for driving a vehicle and performing an operation for discharging the battery, a temperature sensor for detecting the temperature of the battery, and a charge/discharge controller for forcibly charging/discharging the battery within a predetermined charging range when the temperature of the battery is at a temperature not exceeding a predetermined temperature to control the temperature of the battery to a predetermined temperature by using heat generated from the charge/discharge.

The foregoing structure is arranged to forcibly perform charge/discharge when the temperature of the battery is at a temperature not exceeding a predetermined temperature to pass an electric current to the battery so as to generate heat by the internal resistance of the battery. Since the battery can be heated from its inside portion in the foregoing case, the temperature of the battery can quickly be raised to the predetermined temperature. As a result, preparation for generating a required large output can quickly and easily be performed.

It is preferable that the first aspect has a structure in which the charge/discharge controller controls charge/discharge with respect to the battery such that the state of charge of the battery coincides with a target state of charge when the temperature of the battery is at a temperature exceeding a predetermined temperature.

To achieve the foregoing object, the first aspect may have a structure in which the charge of the battery is performed such that a requested output from the engine is enlarged to operate the generator when a present state of charge of the battery is not the maximum state of charge.

The foregoing structure enables the battery to perform quick heat generation. Since the charging efficiency deteriorates and great heat is generated in the vicinity of the maximum state of charge, increase in the temperature of the battery can be accelerated.

To achieve the foregoing object, the first aspect may have a structure in which the charge of the battery is performed such that the requested output from the engine is reduced to rotate the motor when the present state of charge of the battery is the maximum state of charge.

The foregoing structure enables reliable temperature rise of the battery while maintaining an amount of charge for driving the vehicle.

To achieve the foregoing object, the foregoing aspect may have the structure in which charge/discharge of the battery is repeatedly performed between the target state of charge and the maximum state of charge.

The foregoing structure enables quick temperature rise owning to the repetitive operation of the charge/discharge. Moreover, required electric power can be supplied if a large amount of power consumption is requested to the battery because of rapid acceleration or the like.

DETAILED DESCRIPTION OF PREFERRED EMBODIMENTS

A preferred embodiment (hereinafter referred to as an "embodiment") of the present invention will now be described with reference to the drawings.

Figure 1:
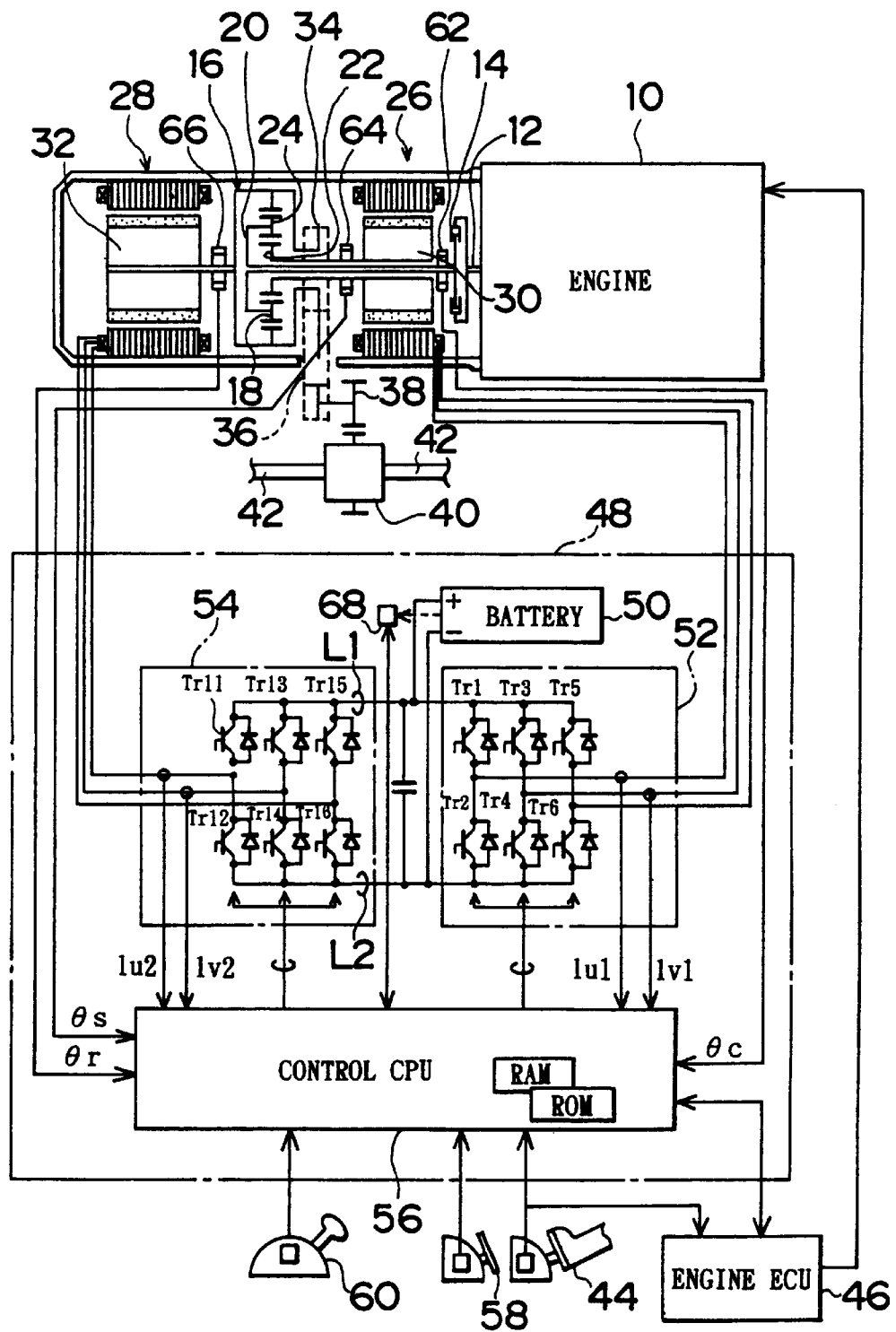
FIG. 1 is a schematic view showing the structure of a power plant of a hybrid car.

FIG. 1 is a schematic view showing a power plant of a hybrid car having the apparatus for controlling a charge/discharge state according to the present invention mounted thereon. A planetary carrier 20 for supporting a planetary gear 18 of a planetary gear mechanism 16 is connected to an output shaft 12 of an engine 10 through a helical damper 14. A sun gear 22 and a ring gear 24 of the planetary gear mechanism 16 are connected to rotors 30 and 32 of a first motor-generator 26 and a second motor-generator 28, respectively. The first and second motor-generators 26 and 28 act as three-phase AC generators or three-phase AC motors. Moreover, a power take-off gear 34 is connected to the ring gear 24. The power take-off gear 34 is connected to a differential gear 40 through a chain 36 and a gear train 38. A drive shaft 42, which has leading ends to which drive wheels (not shown) are connected, is connected to the output portion of the differential gear 40. As a result of the foregoing structure, the output of the engine 10 or outputs of the first and second motor-generators 26 and 28 are transmitted to the drive wheels such that the vehicle can be driven.

In accordance with environmental conditions including the amount of operation of an accelerator pedal 44, the temperature of cooling water, the negative pressure in a suction pipe and operating conditions of the first and second motor-generators 26 and 28, the output and number of revolutions of the engine 10 are controlled by an engine ECU 46. The first and second motor-generators 26 and 28 are controlled by a control unit 48. The control unit 48 includes a battery (a secondary battery) 50 for supplying electric power to the first and second motor-generators 26 and 28 and receiving electric power from the first and second motor-generators 26 and 28. Electric power is supplied/received between the battery 50 and the first and second motor-generators 26 and 28 through corresponding first and second inverters 52 and 54, respectively. The first and second inverters 52 and 54 are controlled by a control CPU 56. The foregoing control is performed in accordance with the information with respect to the operating state of the engine 10 communicated from the engine ECU 46, an amount of depression of the accelerator pedal 44, an amount of depression of a brake pedal 58, a shift range determined by a shift lever 60, a state of charge of the battery, and a rotational angle θs of the sun gear of the planetary gear mechanism 16, a rotational angle θc of the planetary carrier and a rotational angle θr of the ring gear. The rotational angles of the three factors of the planetary gear mechanism 16 are detected by a planetary gear resolver 62, a sun gear resolver 64 and a ring gear resolver 66, respectively. Electric power stored in the battery, that is, the SOC is calculated by a battery ECU 68. The control CPU 56 controls transistors Tr1 to Tr6 and Tr11 to Tr16 of the first and second inverters 52 and 54. The foregoing control is performed in accordance with the foregoing conditions, u-phase and v-phase currents Iu1, Iv1, Iu2 and Iv2 of the first and second motor-generators 26 and 28, and currents L1 and L2 which are supplied from the battery or the other inverter or which are supplied to the battery or the other inverter.

The gear ratio ρ of the sun gear and the ring gear of the planetary gear mechanism 16, the number Ns of revolutions of the sun gear, the number Nc of the revolutions of the planetary carrier and the number Nr of revolutions of the ring gear satisfy the relationship expressed by the following equation (1):

$$Ns=Nr-(Nr-Nc)(1+\rho)/\rho \qquad (1)$$

When two numbers of revolutions of Ns, Nc and Nr are fixed, the other number of revolutions can be determined. The number Nr of revolutions of the ring gear is determined in accordance with the speed of the vehicle. When either of the number Nc of revolutions of the planetary carrier, that is, the number of revolutions of the engine or the number Ns of revolutions of the sun gear, that is, the number of revolutions of the first motor-generator is fixed, the other number of revolutions can be determined. Then, the magnetic field currents of the first and second motor-generators 26 and 28 are controlled in accordance with the present number of revolutions so that it can be determined whether each of the first and second motor-generators 26 and 28 is being operated as a generator or a motor. In a state in which the first and second motor-generators 26 and 28 are consuming electric power, the battery 50 supplies electric power to the first and second motor-generators 26 and 28. In a state in which the first and second motor-generators 26 and 28 are generating electric power, the battery 50 is charged by the first and second motor-generators 26 and 28. When lowering of the SOC of the battery 50 has been detected by the battery ECU 68, a portion of torque generated by the engine 10 is used to cause the motor-generator 26 and/or the motor-generator 28 to generate electric power. Thus, the battery 50 is charged with electric power. When the SOC of the battery 50 has been raised, the output of the engine 10 is somewhat restrained. And as a substitute for the engine 10, the second motor-generator 28 acts as the motor. Thus, the torque generated by the motor is used to drive the vehicle. During braking, the first motor-generator 26 and/or the second motor-generator 28 is operated to act as the generator so as to charge the battery 50 with the generated electric power.

Since it is difficult to predict as to when braking of the automobile is performed, it is preferable to bring the battery 50 to a state where it is sufficiently supplied with electric power generated by regenerative braking. When output of the engine 10 is insufficient to achieve acceleration required by a driver, the second motor-generator 28 has to be operated to act as the motor. To achieve this, the battery 50 has to maintain the SOC to a certain extent. To satisfy the foregoing condition, the SOC of the battery 50 is controlled to be about half of the capacity of the battery, that is, half of the maximum electric power which can be stored in the battery. In this embodiment, control is performed so as to set the SOC to about 50%.

Figure 2:
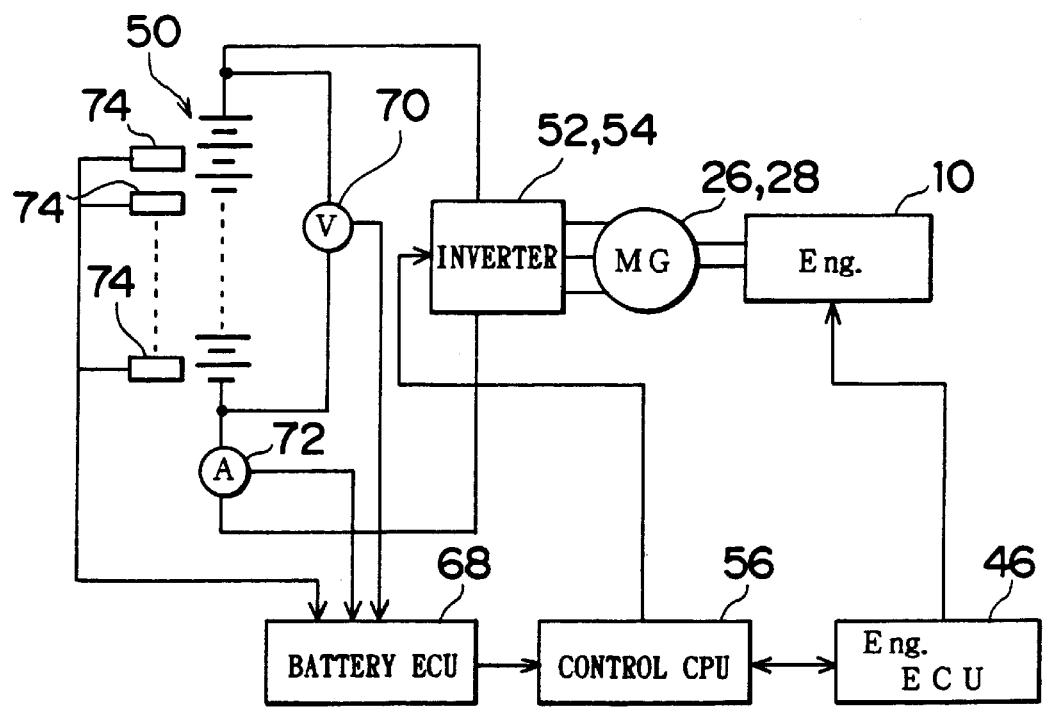
FIG. 2 is a schematic view showing the structure of an apparatus for controlling a charge/discharge state of a hybrid car according to an embodiment of the present invention.

FIG. 2 shows the schematic structure of this embodiment. Referring to FIG. 2, common elements to those shown in FIG. 1 are given the same reference numerals. As shown in FIG. 2, the battery 50 is a combined battery formed by connecting a plurality of cells in series. The battery 50 is connected to the first and second motor-generators 26 and 28 through the first and second inverters 52 and 54, respectively. The first and second motor-generators 26 and 28 are connected to the engine 10 through a transmission mechanism incorporating the planetary gear mechanism. A voltage sensor 70, serving as a voltage detecting means for detecting the terminal voltage of the battery 50, and a current sensor 72 for detecting an electric current that flows into the battery 50 are provided. Moreover, the battery 50 is provided with a plurality of temperature sensors 74 at different positions, each serving as temperature detecting means for detecting the temperatures of the respective positions of the battery 50. The reason why plural temperature sensors 74 are used is because the temperature of the battery 50 varies depending on the position thereof. Outputs from the voltage sensor 70, the current sensor 72 and the temperature sensors 74 are communicated to the battery ECU 68. In accordance with the obtained voltage and electric current, the battery ECU 68 calculates the SOC of the battery. Moreover, the battery ECU 68 transmits information about the temperatures to the control CPU 56. The control CPU 56 collectively uses data communicated from the battery ECU 68 and various data items supplied from the engine ECU 46 to determine the operating states of the first and second motor-generators 26 and 28. In accordance with the determined states, the control CPU 56 controls the first and second inverters 52 and 54. In the hybrid car for use in this embodiment, electric power stored in the battery 50 is consumed by the second motor-generator 28. The regenerative electric power generated by the first and second motor-generators 26 and 28 and the electric power generated by the first and second motor-generators 26 and 28 serve as a generator that is acted on by the engine 10 to the battery 50. Therefore, the first and second motor-generators 26 and 28 and the engine 10 serve as the charge/discharge means for supplying electric power to the battery 50 and consuming electric power of the battery 50. The control CPU 56 for controlling the first and second motor-generators 26 and 28 through the first and second inverters 52 and 54 and the engine ECU 46 serve as the charge/discharge control means for controlling the charge/discharge means.

When the temperature of the battery 50 is at a temperature not exceeding a predetermined temperature (for example, 20° C.), the battery 50 cannot supply its output to the second motor-generator 28 as described above. Therefore, in the structure of this embodiment, when the temperature sensor 74 detects that the temperature of the battery 50 is at a temperature not exceeding a predetermined temperature, the battery ECU 68 turns on a temperature-raising flag which has to be detected by the control CPU 56. Thus, a state of control performed by the control CPU 56 is changed from a usual mode to a temperature-raising mode. Therefore, positive raising of the temperature of the battery 50 is started.

The usual mode for the control CPU 56 refers to a control mode in which the SOC is brought to the target state of charge (for example, SOC=50%) by arbitrarily switching charge/discharge of the battery 50. When the SOC is, for example, 50% or lower, the charge is enhanced by enlarging the required output from the engine 10 as compared with the usual state (for example, at the speed or torque required by the driver). Thus, the first motor-generator 26 or the second motor-generator 28 is caused to generate electric power so as to charge the battery 50. When the SOC of the battery 50 has been raised, for example, when the SOC has been made to be higher than 50% (the center of the control), the required output from the engine 10 is somewhat restrained as compared with the usual state. Thus, the second motor generator 28 is operated as the motor such that electric power in the battery 50 is consumed, and the generated torque from the second motor generator 28 is used to drive the vehicle.

Figures 3A, 3B:
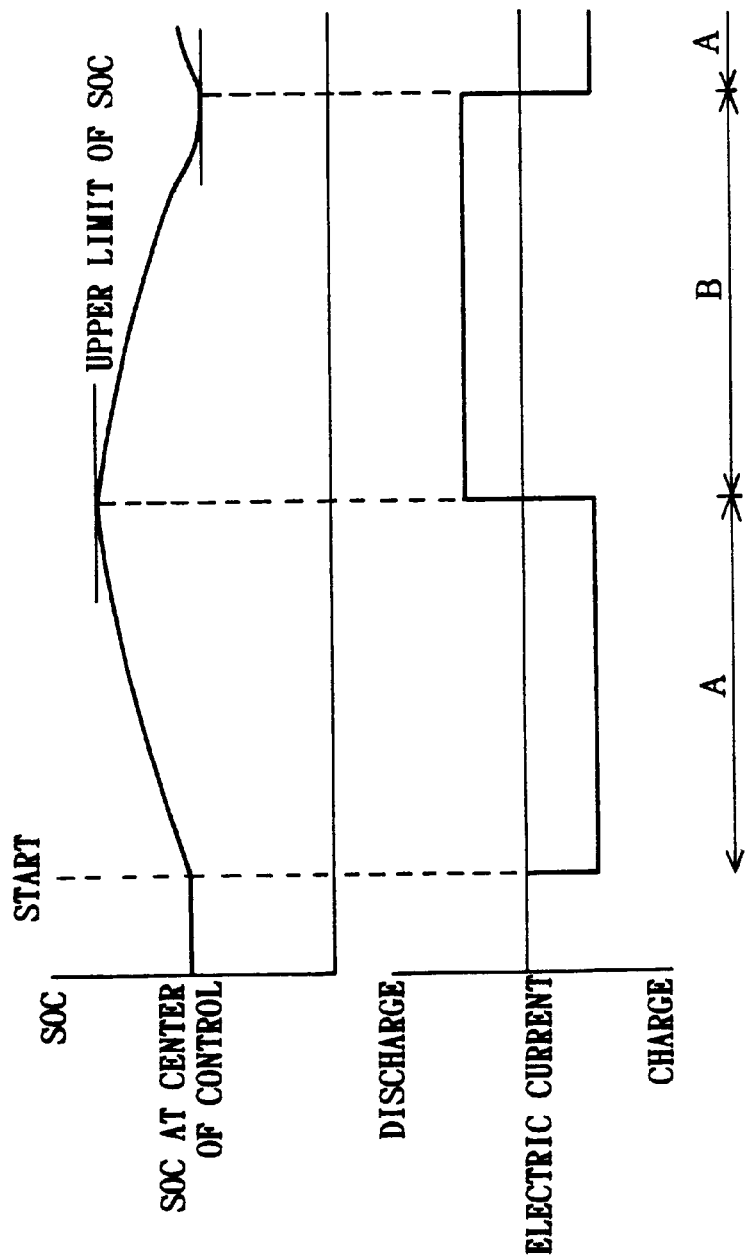
FIG. 3A is a graph showing a state of an SOC during control of rise in the temperature, which is being performed by the apparatus for controlling a charge/discharge state of a hybrid car according to the embodiment of the present invention.
FIG. 3B is a graph showing a state of charge/discharge during control of rise in the temperature, which is being performed by the apparatus for controlling a charge/discharge state of a hybrid car according to the embodiment of the present invention.

On the other hand, the temperature-raising mode refers to the mode in which charge/discharge of the battery 50 is positively repeated. When the SOC is higher than 50% (the center of the control) as shown in FIG. 3A, the battery ECU 68 turns on the temperature-raising flag to be detected by the control CPU 56. Then, the battery ECU 68 enlarges the requested output from the engine 10 as compared with the usual state to cause the charging operation to be performed to the maximum state of charge of the battery 50. Thus, the first motor-generator 26 and/or the second motor-generator 28 are operated to generate electric power so as to charge the battery 50 (in region A). After the maximum state of charge has been realized, the discharging operation is performed until the target state of charge is realized by somewhat restraining the requested output from the engine 10 as compared with the usual state. Moreover, the second motor-generator 28 is operated as the motor to consume electric power of the battery 50 (in region B). As a result of the foregoing charge/discharge operation, the electric current that flows in the battery 50 causes the internal resistance of the battery 50 to generate heat. Thus, the battery 50 is heated from the inside portion thereof. FIG. 3A shows only change in the SOC in the temperature-raising mode. FIG. 3B shows only change in the charge/discharge. Therefore, the change in the SOC and the change in the charge/discharge caused by electric power which is consumed when the hybrid car is started are omitted. The discharge operation in the region B is performed during running of the hybrid car. Therefore, it is required to complete the start of the hybrid car at a timing within the region A. Since the hybrid car is started by the motor in principle, electric power is consumed when the starting operation is performed. Thus, the SOC and the amount of charge/discharge are changed. However, the foregoing changes are omitted from FIG. 3A.

Figure 4:
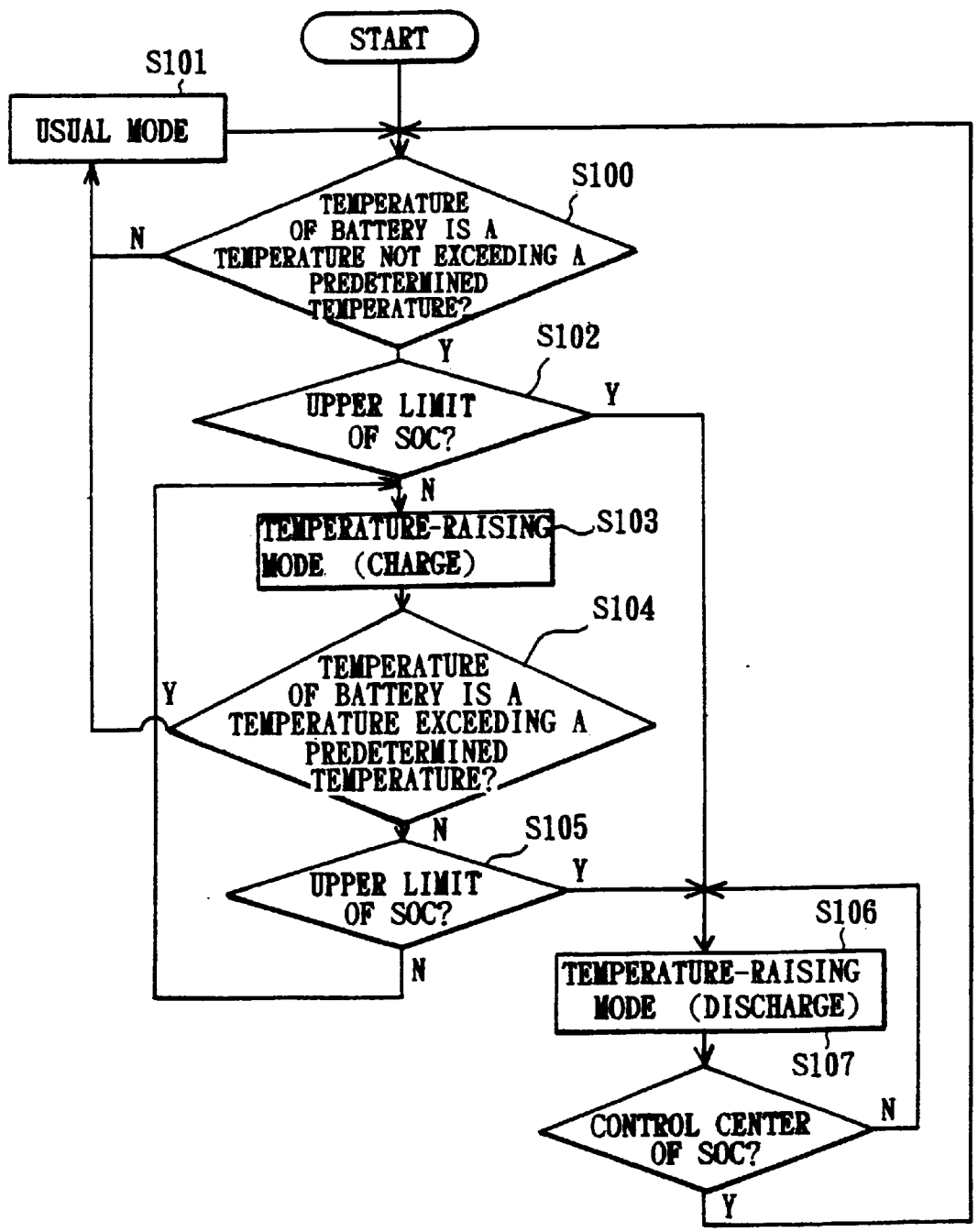
FIG. 4 is a flow chart showing the procedure to control rise in the temperature, which is performed by the apparatus for controlling a charge/discharge state of a hybrid car according to the embodiment of the present invention.

FIG. 4 is a flow chart showing the procedure carried out by battery ECU 68 to switch the mode of the control CPU 56. When the hybrid car has been started (the ignition key has been switched on), the temperature sensors 74 measure temperatures of the battery 50 at the predetermined positions. Results of the measurements are input to the battery ECU 68. The battery ECU 68 determines whether the temperature of the overall body of the battery 50 or the temperature at any one of the points is at a temperature not exceeding a predetermined temperature (for example, 20° C.) (S100). If the temperature of the battery 50 is higher than the predetermined temperature, the battery ECU 68 determines that the control CPU 56 is permitted to operate in the usual mode (S101). That is, the battery ECU 68 requires the control CPU 56 to perform control such that the SOC of the battery 50 is made to be the target state of charge (the center of the control) by performing a charging operation or a discharging operation.

If a portion or the overall body of the battery 50 is at a temperature not exceeding a predetermined temperature, the battery ECU 68 determines whether the SOC is in the maximum state of charge (for example, the upper limit of the SOC=80%) (S102). If the SOC is not the upper limit, the mode of the battery ECU 68 is shifted to the temperature-raising mode (S103). The operation for raising the temperature is, at this time, performed by a forcible charging operation. That is, the requested output from the engine 10 is enlarged as compared with the usual state (for example, at the speed or torque required by the driver). Thus, the first motor-generator 26 and/or the second motor-generator 28 is operated to generate electric power so as to charge the battery 50. As the SOC approaches the upper limit, the charging efficiency deteriorates. On the other hand, the heating value caused from the internal resistance of the battery 50 is enlarged. Thus, the temperature raising efficiency is improved. During the foregoing operation, the battery ECU 68 supervises the temperature of the battery 50 through the temperature sensors 74. The battery ECU 68 always determines whether the temperature of the battery 50 is higher than the predetermined temperature (S104). If the temperature of the battery 50 has been raised to the level higher than the predetermined temperature (for example, 20° C.) owning to the foregoing forcible charge, the operation proceeds to step 101 where the battery ECU 68 switches the control to the usual mode. If the temperature of the battery 50 is not raised to the predetermined temperature, the battery ECU 68 continues to make a determination whether the SOC of the battery ECU 68 has been raised to the upper limit (S105). If the SOC has not been raised to the upper limit, the operation is returned to step 103 where the operation for raising the temperature according to the charge is continued.

If it is determined in steps 102 or 105 that the SOC is at the upper limit, that is, the battery 50 is in the maximum state of charge, the mode is switched to the temperature-raising mode by performing discharge controlling (S106). In this case, the discharge is performed by reducing the requested output from the engine with respect to the request (the speed or torque) from the driver to drive the hybrid car. Correspondingly, the motor is positively operated. The battery ECU 68 supervises whether the SOC has been raised to the target state of charge (the center of the control) also during discharging (S107). The battery ECU 68 continues discharging until the SOC has been raised to the target state of charge. If the battery ECU 68 determines that the SOC has been raised to the target state of charge, the operation of the battery ECU 68 is returned to step 100. Thus, the battery ECU 68 again determines whether the temperature of the battery 50 is at a temperature not exceeding a predetermined temperature. Accordingly, the battery ECU 68 determines whether the temperature-raising mode is continued or switched to the usual mode. That is, when the temperature of the battery 50 is at a temperature not exceeding a predetermined temperature, the battery ECU 68 continues the temperature-raising operation by repeating the charging operation and the discharging operation, as shown in FIG. 3A and FIG. 3B. If the temperature of the battery 50 is raised to a level higher than the predetermined temperature, the mode is shifted to the usual mode.

In this embodiment, if the temperature of the battery 50 is at a temperature not exceeding a predetermined temperature, the charging operation is performed until the SOC is raised to the upper limit (for example, 80%). It is preferable that the upper limit of the SOC is arbitrarily determined in consideration of the fact that regenerative braking, which is generated when the vehicle is stopped, is received. Although the temperature at which the determination is made whether the temperature of the battery is raised is made to be 20°, this temperature may arbitrarily be changed in accordance with the performance of the battery. The illustrated structure is only shown as one example of embodiments of the present invention. If the structure is arranged such that when the temperature of the battery is not higher than a predetermined temperature, forcible charge/discharge of the battery is performed to raise the temperature of the battery to a predetermined temperature by using generated heat, each structure may arbitrarily be changed.

What is claimed is:

1. An apparatus for controlling a charge/discharge state of a hybrid car having generators for charging a battery by operating an engine and motors for discharging the battery by driving the hybrid car, the apparatus comprising:

a temperature sensor that detects a temperature of the battery; and a charge/discharge controller that forcibly charges/discharges the battery within a predetermined charging range of the battery when the temperature of the battery is at a temperature not exceeding a predetermined temperature to control the temperature of the battery to be in a predetermined temperature range by using heat generated by the charge/discharge.

2. An apparatus for controlling a charge/discharge state of a hybrid car according to claim 1, wherein in a state where the temperature of the battery is at a temperature exceeding the predetermined temperature, the charge/discharge controller controls charge/discharge of the battery such that a state of charge of the battery coincides with a target state of charge.

3. An apparatus for controlling a charge/discharge state of a hybrid car according to claim 2, wherein the charge of the battery is performed by increasing a requested output from the engine of the hybrid car and operating the generators to charge the battery when the present state of charge of the battery is not a maximum state of charge.

4. An apparatus for controlling a charge/discharge state of a hybrid car according to claim 3, wherein the charge/discharge of the battery is repeatedly performed between the target state of charge and the maximum state of charge.

5. An apparatus for controlling a charge/discharge state of a hybrid car according to claim 2, wherein the discharge of the battery is performed by reducing a requested output of the engine of the hybrid car and operating the motors as hybrid car drive motors when the present state of charge is the maximum state of charge.

6. An apparatus for controlling a charge/discharge state of a hybrid car according to claim 5, wherein the charge/discharge of the battery is repeatedly performed between the target state of charge and the maximum state of charge.

7. An apparatus for controlling a charge/discharge state of a hybrid car according to claim 2, wherein the charge/discharge of the battery is performed between the target state of charge and the maximum state of charge.

8. An apparatus for controlling a charge/discharge state of a hybrid car according to claim 1, wherein the charge of the battery is performed by increasing a requested output of the engine of the hybrid car and operating the generators of the hybrid car when the present state of charge is not a maximum state of charge.

9. An apparatus for controlling a charge/discharge state of a hybrid car according to claim 8, wherein the charge/discharge of the battery is repeatedly performed between a target state of charge and the maximum state of charge.

10. An apparatus for controlling a charge/discharge state of a hybrid car according to claim 1, wherein the discharge of the battery is performed by reducing a requested output of the engine of the hybrid car and operating the motors as hybrid car drive motors when the present state of charge is a maximum state of charge.

11. An apparatus for controlling a charge/discharge state of a hybrid car according to claim 10, wherein the charge/discharge of the battery is repeatedly performed between a target state of charge and the maximum state of charge.

12. An apparatus for controlling a charge/discharge state of a hybrid car according to claim 1, wherein the charge/discharge of the battery is repeatedly performed between a target state of charge and the maximum state of charge.

13. A method of controlling a charge/discharge state of a hybrid car having generators operated by an engine for charging a battery and motors for discharging the battery by driving the hybrid car, the method comprising steps of:

detecting a temperature of a battery mounted on a hybrid car;

determining whether the temperature of the battery is at a temperature not exceeding a predetermined temperature; and charging/discharging the battery forcibly within a predetermined charge range of the battery when the temperature of the battery is at a temperature not exceeding the predetermined temperature.

14. A method of controlling a charge/discharge state of a hybrid car according to claim 13, wherein the charge/discharge of the battery is repeatedly performed between a target state of charge and a maximum state of charge.

15. A method of controlling a charge/discharge state of a hybrid car according to claim 13, further comprising steps of:

detecting a present state of charge of the battery;

determining whether the state of charge of the battery is a maximum state of charge; and increasing a requested output from the engine of the hybrid car and operating the generators of the hybrid car so as to charge the battery when it is determined that the present state of charge of the battery is not the maximum state of charge.

16. A method of controlling a charge/discharge state of a hybrid car according to claim 15, wherein the charge/discharge of the battery is repeatedly performed between a target state of charge and the maximum state of charge.

17. A method of controlling a charge/discharge state of a hybrid car according to claim 13, further comprising steps of:

detecting a present state of charge of the battery;

determining whether the present state of charge of the battery is a maximum state of charge; and reducing a requested output from the engine of the hybrid car and operating the motors of the hybrid car to discharge the battery when it is determined that the present state of charge of the battery is the maximum state of charge.

18. A method of controlling a charge/discharge state of a hybrid car according to claim 17, wherein the charge/discharge of the battery is repeatedly performed between a target state of charge and the maximum state of charge.

* * * * *